United States Patent
Van Den Berk

(10) Patent No.: US 10,150,615 B2
(45) Date of Patent: Dec. 11, 2018

(54) STORAGE SYSTEM AND METHOD FOR CARRYING OUT MAINTENANCE IN SUCH A STORAGE SYSTEM

(71) Applicant: VANDERLANDE INDUSTRIES B.V., Veghel (NL)

(72) Inventor: Franciscus Maria Van Den Berk, Son en Breugel (NL)

(73) Assignee: VANDERLANDE INDUSTRIES B.V., Veghel (NL)

(*) Notice: Subject to any disclaimer, the term of this patent is extended or adjusted under 35 U.S.C. 154(b) by 77 days.

(21) Appl. No.: 15/104,732

(22) PCT Filed: Dec. 19, 2014

(86) PCT No.: PCT/NL2014/050888
§ 371 (c)(1),
(2) Date: Jun. 15, 2016

(87) PCT Pub. No.: WO2015/093961
PCT Pub. Date: Jun. 25, 2015

(65) Prior Publication Data
US 2016/0311617 A1 Oct. 27, 2016

(30) Foreign Application Priority Data
Dec. 19, 2013 (NL) .................... 2011987

(51) Int. Cl.
*F16P 1/00* (2006.01)
*B65G 1/04* (2006.01)

(52) U.S. Cl.
CPC .......... *B65G 1/0492* (2013.01); *F16P 1/00* (2013.01); *B65G 2207/40* (2013.01)

(58) Field of Classification Search
CPC .................. B65G 2207/40; F16P 1/00
(Continued)

(56) References Cited

U.S. PATENT DOCUMENTS 6,834,215 B1* 12/2004 Ostwald ............. G11B 15/6835
369/178.01
7,591,630 B2 9/2009 Lert, Jr.
(Continued)

FOREIGN PATENT DOCUMENTS

JP 63267604 A 4/1988

OTHER PUBLICATIONS

International Search Report and Written Opinion of corresponding International Application No. PCT/NL/2014/050888; dated Mar. 3, 2015: 10 pages.

*Primary Examiner* — Mark C Hageman
(74) *Attorney, Agent, or Firm* — Shumaker, Loop & Kendrick, LLP

(57) ABSTRACT

A storage system having at least two parallel racks and an aisle extending between respective sets of adjacent racks, through which shuttles can move forward and backward over respective guides parallel to the racks on a multitude of superposed levels for placing products in storage positions and/or removing products from storage positions. The storage system further includes a maintenance cart which can be moved through an aisle and which defines a working space for an individual, bounded at least partially by a frame of the maintenance cart, for carrying out maintenance from the working space on a shuttle, wherein the frame extends over at least two levels of the multitude of levels and forms a screen for the working space against shuttles in the aisle in question. The maintenance cart can be moved over a guide for the shuttles through an aisle.

16 Claims, 10 Drawing Sheets

(58) Field of Classification Search
USPC .................................................. 182/36–39
See application file for complete search history.

(56) References Cited

U.S. PATENT DOCUMENTS

| | | | | |
|---|---|---|---|---|
| 7,757,813 | B2* | 7/2010 | Kerr | E06C 1/397 |
| | | | | 182/36 |
| 8,694,152 | B2* | 4/2014 | Cyrulik | B65G 1/0492 |
| | | | | 700/214 |
| 9,150,231 | B2* | 10/2015 | De Jong | B65G 1/04 |
| 9,280,157 | B2* | 3/2016 | Wurman | G05D 1/0214 |
| 2012/0185080 | A1 | 7/2012 | Cyrulik et al. | |

* cited by examiner

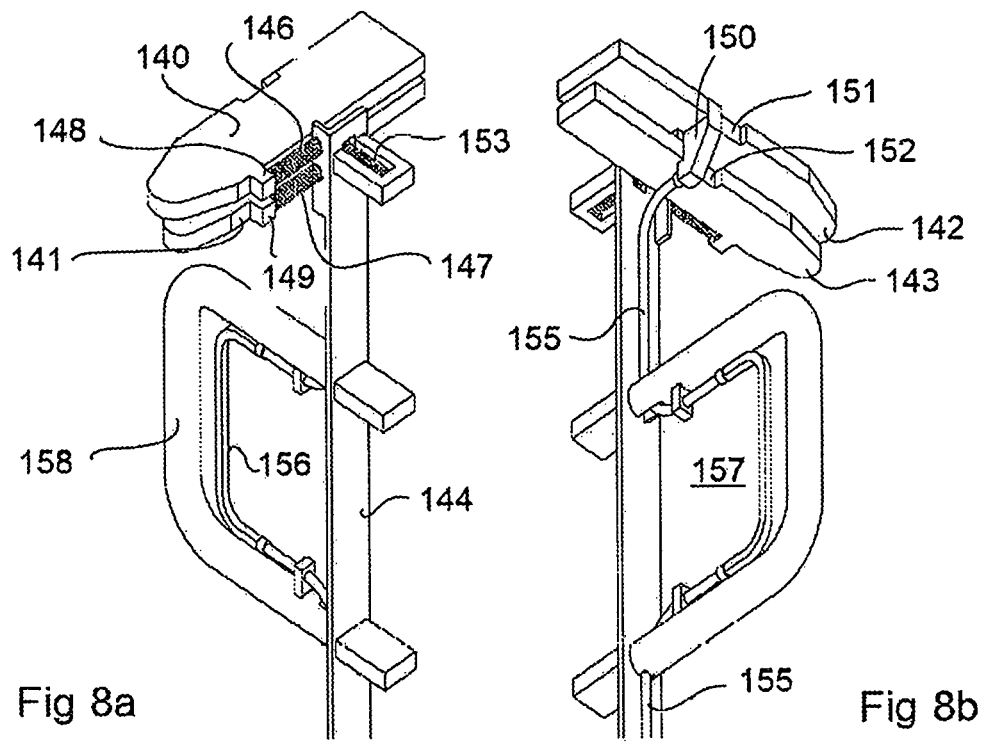
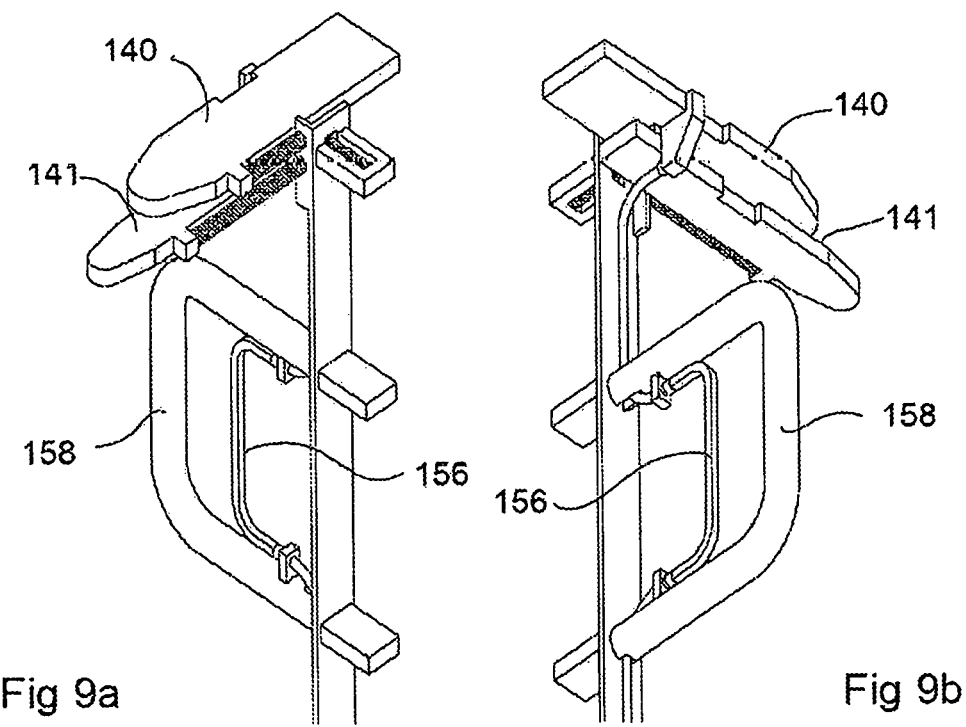

STORAGE SYSTEM AND METHOD FOR CARRYING OUT MAINTENANCE IN SUCH A STORAGE SYSTEM

TECHNICAL FIELD AND BACKGROUND OF THE INVENTION

The present invention relates to a storage system comprising at least two parallel racks with storage positions for products disposed beside and above each other and with an aisle extending between respective sets of at least two adjacent racks, through which shuttles can move forward and backward over respective guides parallel to the racks on a multitude of superposed levels for placing products in the storage positions and/or removing products from the storage positions, wherein the storage system further comprises a maintenance cart which can be moved through an aisle.

The present invention further relates to a method for carrying out maintenance or the like on a shuttle in such a storage system.

U.S. Pat. No. 7,591,630 discloses a storage system in which products are stored in containers such as bins in racks disposed parallel to each other. Autonomously operating shuttles can move through aisles between the racks in the storage system. The shuttles are for that purpose each provided with their own driving system, including a battery, and are capable of autonomously storing a container with one or more products in a desired storage position or collecting it therefrom and transport it to a collecting location on the basis of wirelessly transmitted commands from a central storage system. The shuttles can furthermore move from one aisle to another aisle and also from one level to another level.

When a shuttle comes to a standstill within the storage system in use, an individual, such as a maintenance mechanic, must localise and approach the shuttle in question. To approach the shuttle in question is, platforms are provided in the storage system according to U.S. Pat. No. 7,591,630, over which the shuttles can move at every level. Said platforms can each be swung to one side. This makes it possible to fold up platforms of respective levels from a position located one or a number of levels above the shuttle in question and to repeat this action until a maintenance mechanic has reached the shuttle and can carry out maintenance or repairs from the upper side of the shuttle. This is a laborious and complex process, whilst in addition the shuttle is only accessible to a limited extent to the maintenance mechanic. In the above-mentioned known storage system and also in particular in storage systems that are not provided with the aforesaid folding platforms and wherein the maintenance mechanic must make his way through the aisles to approach a shuttle, a large part of the storage system must be shut down for the sake of the safety of the maintenance mechanic during the time the mechanic is present within the system. However, in view of the large number shuttles that move autonomously through the storage system on various levels, the speed at which the shuttles move, the lack of possibilities for the maintenance mechanic to get out of the way in the aisles and the wireless control of the autonomously operating shuttles, it remains risky for the maintenance mechanic to enter the aisles, as it is very difficult to guarantee that the relevant part of the system has actually been shut down completely and no shuttles will pass through the aisle in question. In addition, shutting down a major part of the storage system is undesirable for efficiency reasons.

US 2012/0185080 discloses a storage system as described in the introduction. The possibility of using a maintenance cart is suggested in general terms in said publication, special details thereof are not revealed.

BRIEF SUMMARY OF THE INVENTION

It is an object of the present invention to provide a storage system in which an individual, for example a maintenance mechanic, can carry out maintenance, repairs or the like on shuttles present within the storage system in a simple and safe manner with minimal adverse effects on the efficiency of the storage system.

The above object is achieved with the storage system according to the invention, which is characterised in that the maintenance cart defines a working space for an individual, bounded at least partially by a frame of the maintenance cart, for carrying out maintenance from said working space on a shuttle as mentioned before in an aisle when the maintenance cart is present in the aisle in question, wherein the frame extends over at least two levels of the multitude of levels and forms a screen for the working space against shuttles in the aisle in question, and wherein the maintenance cart can be moved over a guide for the shuttles through an aisle. An advantage of the storage system according to the invention is that an individual, for example a maintenance mechanic, can enter the storage system in a safe and simple manner, using the maintenance cart according to the invention, because the working space in which the maintenance mechanic is located is not accessible to shuttles that can move through the aisle on the levels over which the frame extends. Using the storage system according to the invention provided with the maintenance cart, a storage system is provided in which maintenance or the like can be carried out in a safe manner on shuttles present within the system. In addition, because of the use of the maintenance cart only a relatively small part of the storage system needs to be shut down, because the safety of the individual, for example the maintenance mechanic, is already ensured to a high degree in that use is made of the maintenance cart. In addition to that, the use of the maintenance cart does not necessarily mean that substantial additional means are required in the storage system, because the guides for the shuttles can be used for moving the maintenance cart through an aisle. The existing shuttle guides can be utilised even more usefully, whilst separate guides for the maintenance cart are not needed.

Preferably, the frame extends over at least three levels of said multitude of levels. Partially dependent on the height of each level, a screened-off working space in which an individual can stand upright can thus be obtained. It is noted in this regard that the storage system may comprise several separate maintenance carts disposed one above the other.

The maintenance cart is preferably provided with at least one guide means, of which preferably at least one guide means is a wheel, more preferably a running wheel, which at least one guide means cooperates with the guide in use. The movement of the maintenance cart through an aisle can thus be realised in a simple manner by an individual. When at least one running wheel is used, the running wheel will run over a running surface of the guide during movement of the maintenance cart. The present preferred embodiment does not require that all the guide means that are used be of the same type. Thus it is possible to use combinations of running wheels that are rotatable about horizontal axes, guide wheels that are rotatable about vertical axes and/or sliding elements.

A stable movement of the maintenance cart through an aisle as well as a stable positioning of the maintenance cart in an aisle can be realised in particular if the maintenance cart is provided with guide means at the level of two superposed guides.

A similar advantage is obtained if the maintenance cart is provided with at least two guide means at the level of a guide, one of which guide means is designed to cooperate with the guide via its upper side, whilst the other guide means is designed to cooperate with the guide via its bottom side. The maintenance cart can thus be retained in vertical direction, whilst actual guiding cooperation between the one guide means and the guide during movement of the maintenance cart through an aisle is not necessary. During normal use there will be guiding cooperation, however, between the other guide means and the guide during the aforesaid movement.

If according to another possible embodiment the two guide means are provided at different longitudinal positions of the guide, an advantage that is obtained is that the introduction of the maintenance cart into an aisle by placing it on a guide at an end thereof can take place in a relatively simple manner in spite of the presence of an end stop on the guide. The present embodiment can furthermore prevent or at least counteract undesirable tilting about a horizontal tilt axis perpendicular to the longitudinal direction of the guide can furthermore.

A platform is preferably provided in the aisle between the racks between which the aisle extends on at least one level in the storage system. If a platform as mentioned above is provided, a maintenance mechanic can move the maintenance cart through an aisle, over the guide, while walking on the platform.

Alternatively, the maintenance cart comprises a driving system for driving at least one running wheel thereof. Preferably, an electrical driving system is used, in which case use will be made of a battery and an electric motor on the maintenance cart.

The frame preferably has the form of a cage, such that an individual present in the working space can at least reach with a limb, such as an arm, outside the working space, which cannot be reached by shuttles, via openings in the cage, for example for carrying out maintenance on a shuttle somewhere in the storage system.

With a view to the stability of the maintenance cart it may be advantageous if at least one guide means is provided on each of the longitudinal sides thereof, which guide means is in guiding contact with the guide on the same respective longitudinal side in use so as to prevent tilting of the maintenance cart in a direction transversely to the longitudinal direction thereof.

It is furthermore advantageous if a row of side-by-side storage positions having the height of one storage position is provided on each level. Although it is alternatively conceivable within the scope of the invention that two successive superposed rows of side-by-side storage positions are provided on each level, this is usually not preferred, since the shuttles will also be more complex in that case, because they must be capable of serving the respective two rows of superposed storage positions by using product transfer means provided on the shuttle.

In a preferred embodiment, the storage system further comprises at least one cross connection on at least one of the number of levels, which at least one cross connection extends transversely to the aisle and which is provided with a guide over which a shuttle can move and which forms a connection between an aisle and a further aisle, and wherein the shuttles are configured to move from one aisle, via a cross connection, to another aisle, wherein furthermore preferably a part of a guide of a cross connection crosses the aisle in a closed position and is movable to an open position, in which the aforesaid part is outside the range of the aisle, so that a maintenance cart can pass the cross connection upon being moved through the aisle. Shuttles may be provided with a first set of wheels for moving over a guide and with a second set of wheels oriented transversely to the first set for moving over a guide of a cross connection.

According to a very advantageous preferred embodiment, the frame of the maintenance cart is at least substantially flat and preferably extends at least substantially in a vertical plane perpendicular to the guides. The dimensions of the maintenance cart in the direction of the guides can thus be limited, which is advantageous in particular if only a limited amount of space is available at one end of the guide for placing the maintenance cart in an aisle at that location. Apart from that, the construction of the maintenance cart as a whole can be very simple, resulting in a lower cost price thereof.

The constructional simplicity of the maintenance cart is furthermore enhanced if the maintenance cart is only provided with guide means on one longitudinal side of the aisle.

Quite preferably, the shuttles are each provided with their own driving system for movement of the shuttle in the storage system, which driving system preferably comprises an electric motor which is operatively connected to a running wheel which rolls over the guide in use, transfer means for placing products in a storage position and/or removing products therefrom, and an energy storage medium for energising the driving system and the transfer means, and signal transfer means designed for wirelessly transmitting signals to a central control system and receiving signals therefrom. Such a shuttle can thus autonomously move to a particular storage position in the storage position in response to wirelessly transmitted commands and place a product in said storage position or remove a product therefrom. The aforesaid transfer means may be formed by the extendable arms provided with product grippers, for example for engaging a product in a form-locked manner, with belts or with suction cups. The energy storage medium may be a battery or, for example, one or more capacitors, preferably super capacitors. The term "product" may be understood to mean a single object or, for example, a tray carrying a number of individual objects.

The maintenance cart preferably comprises openings for carrying out work from one side of the maintenance cart, via the openings, on a shuttle which is present on an opposite side of the maintenance cart. The edges of the openings in that case form a protection for the individual against a shuttle that might unexpectedly move in the direction of the maintenance cart. The openings preferably have inscribed circles with a diameter of at most 15 cm. Such dimensions do not make it possible for an individual to put his head through an opening. The openings may for instance be formed by openings in a wire netting or a lattice-work, or by openings formed in a plate.

To provide increased resistance against an unexpected collision between a shuttle and a stationary maintenance cart, the maintenance cart preferably comprises fixing means for fixing the maintenance cart relative to the guide.

A reliable embodiment of such fixing means can be obtained if the guide is provided with a number of recesses along the length thereof and that the fixing means comprise at least one fixing element, which, when a fixing element is located at the same longitudinal position as a recess, is movable between a free position and a fixing position, in which fixing position, unlike the free position, the fixing element extends within the recess in question. The spacing between successive recesses, at least seen in top plan view, is preferably at most 40 cm, or more preferably at most 25 cm or at most 20 cm.

The maintenance cart preferably comprises operating means for operating the fixing means, so that the individual can easily use the fixing means.

A situation that is safe in practice can be obtained if the maintenance cart comprises at least one handle, wherein an operating element of the operating means forms part of a handle, such that when the handle is engaged of by a user, the operating means will keep the fixing means in the free position and that, when the handle is released by a user, the operating means will urge the fixing means toward the fixing position, for instance due to resilient means or to gravity. This leads to the situation that the maintenance cart can be moved through an aisle only if the handle is engaged by user. If such is not the case, movement of the maintenance cart is not possible, or only to a limited extent.

The present invention further relates to a method for carrying out maintenance or the like on a shuttle in a storage system according to the present invention as described in the foregoing, the method comprising the successive steps of:

a) an individual moving with the maintenance cart toward a shuttle present in an aisle, during which movement the individual is present in the working space, and b) carrying out maintenance or the like on the shuttle from the working space.

The individual can than leave the storage system again with the maintenance cart and possibly also with the shuttle. Advantages of the method according to the invention are analogous to the above-described advantages of the storage system according to the invention. Most importantly during steps a) and b) the individual is protected by the maintenance cart against unexpected movements by a shuttle.

If the maintenance cart is provided with openings as in a previously described possible embodiment, it is advantageous for safety reasons if the maintenance or the like takes place via the openings during step b).

It would also benefit safety if the maintenance cart is fixed to the guide, using the safety means, between step a) and b).

BRIEF DESCRIPTION OF THE DRAWINGS

The invention will be explained in more detail below by means of a description of preferred embodiments of storage systems according to the invention with reference to the following schematic FIGS. 1-13, in which:

FIGS. 8a and 8b are two different isometric views of an operating mechanism of the maintenance cart in operated condition;

FIGS. 9a and 9b are two isometric views of the operating mechanism in non-operated condition;

DETAILED DESCRIPTION OF THE INVENTION

Figure 1:
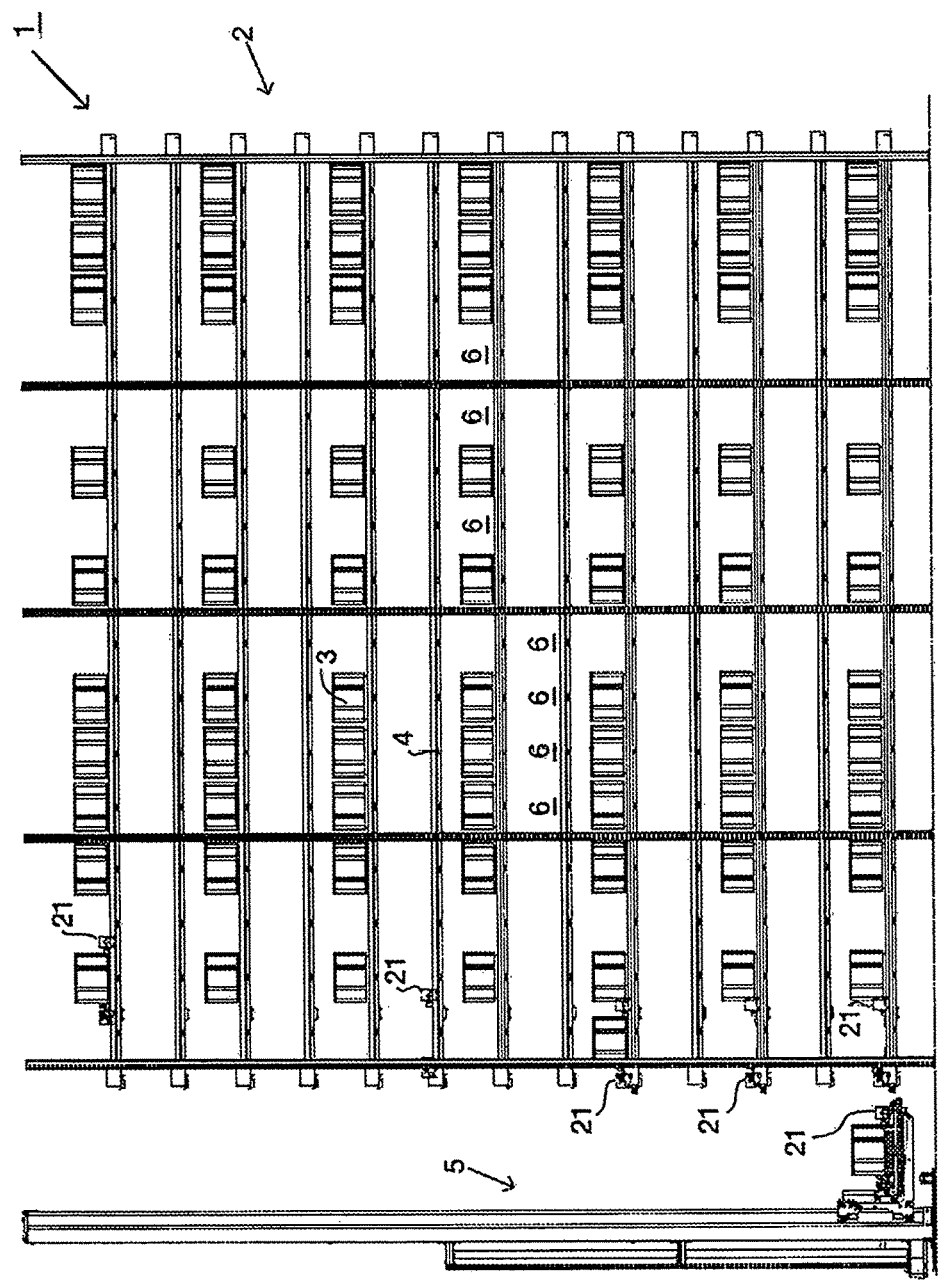
FIG. 1 is a side view of a preferred embodiment of a storage system according to the invention.

The storage system 1 shown in FIG. 1 comprises two adjacent racks, one of which is hidden from view behind the other rack 2 in FIG. 1. Each of the racks has 13 vertical levels. Each rack is provided with a row of sixteen storage positions 6 located side by side on each level thereof. A product bin 3 can be stored in each storage position. Each storage position is for that purpose provided with support means, such as sections, on which the bottom of the product bin 3 is supported.

Between the two adjacent racks an aisle extends. It stands to reason that the storage system may also comprise several mutually parallel racks, with aisles extending between respective adjacent pairs of racks. Horizontal rails 4, being preferred embodiments of guides, are provided on each vertical level, along which rails a shuttle 21 can be moved along a horizontal path of movement parallel to the plane of the drawing. The rails 4 extend over the entire length of the racks, so that each one of the total of 32 rack positions on either side of the aisle on the level in question can be approached by the shuttle 21. In the present example, the storage system 1 comprises six shuttles 21. Five of said shuttles 21 are present on rails 4 for the first, the third, the fifth, the eighth and the thirteenth level, respectively. The sixth shuttle 21 is present on a lift 5 which is provided at the end of the aisle, onto which lift a shuttle 21 can be moved from a rail 4. By means of said lift 5 a shuttle 21, on which a product bin 3 may or may not be present, can be transported to one of the twelve other vertical levels. As indicated above it is also possible for the storage system to comprise more than two mutually parallel racks with an aisle extending between respective adjacent pairs of racks, wherein the lift 5 is movable transversely to the racks for moving a shuttle between various aisles.

Each shuttle 21 has running wheels for moving the shuttle 21 along the rails 4, at least one of which running wheels is driven by an onboard electric motor (not shown). Capacitors are provided on the shuttle 21 for feeding the electric motor with energy, although alternative energy storage media such as an accumulator, for example in the form of a lithium-ion battery, are also possible. The shuttles 21 are designed for wirelessly exchanging signals, for example control signals, with a central control system. The shuttles 21, providing that they are positioned opposite a storage position 6, are each capable either of positioning a product bin 3 from the shuttle 21 in the storage position 6 or of taking a product bin 3 out of the storage position 6 and placing it on the shuttle, using transfer means (not shown) provided on the shuttle.

Although this is not shown in FIG. 1, the storage system 1 may also comprise cross connections extending transversely to the aisles, which will be discussed below in the description of FIG. 2, preferably, but not necessarily, on each of the levels, which cross connections extend right through racks, for example, taking up the space of two storage positions in each rack, for example, or which extend between two racks that are adjacent to one another at their short ends. The cross connections also have guides, for example in the form of rails comparable to the rails 4 described in the foregoing. The shuttles 21 are configured to move from one aisle to another aisle via a cross connection.

The storage system further comprises a maintenance cart (not shown in FIG. 1) which can move through the aisle between two adjacent racks, for example to be used when carrying out repairs on a defect shuttle that has come to a standstill somewhere in the storage system. The maintenance cart and the manner of using said cart in the storage system 1 will be explained in more detail in the description of the storage system according to FIG. 2.

Figure 2:
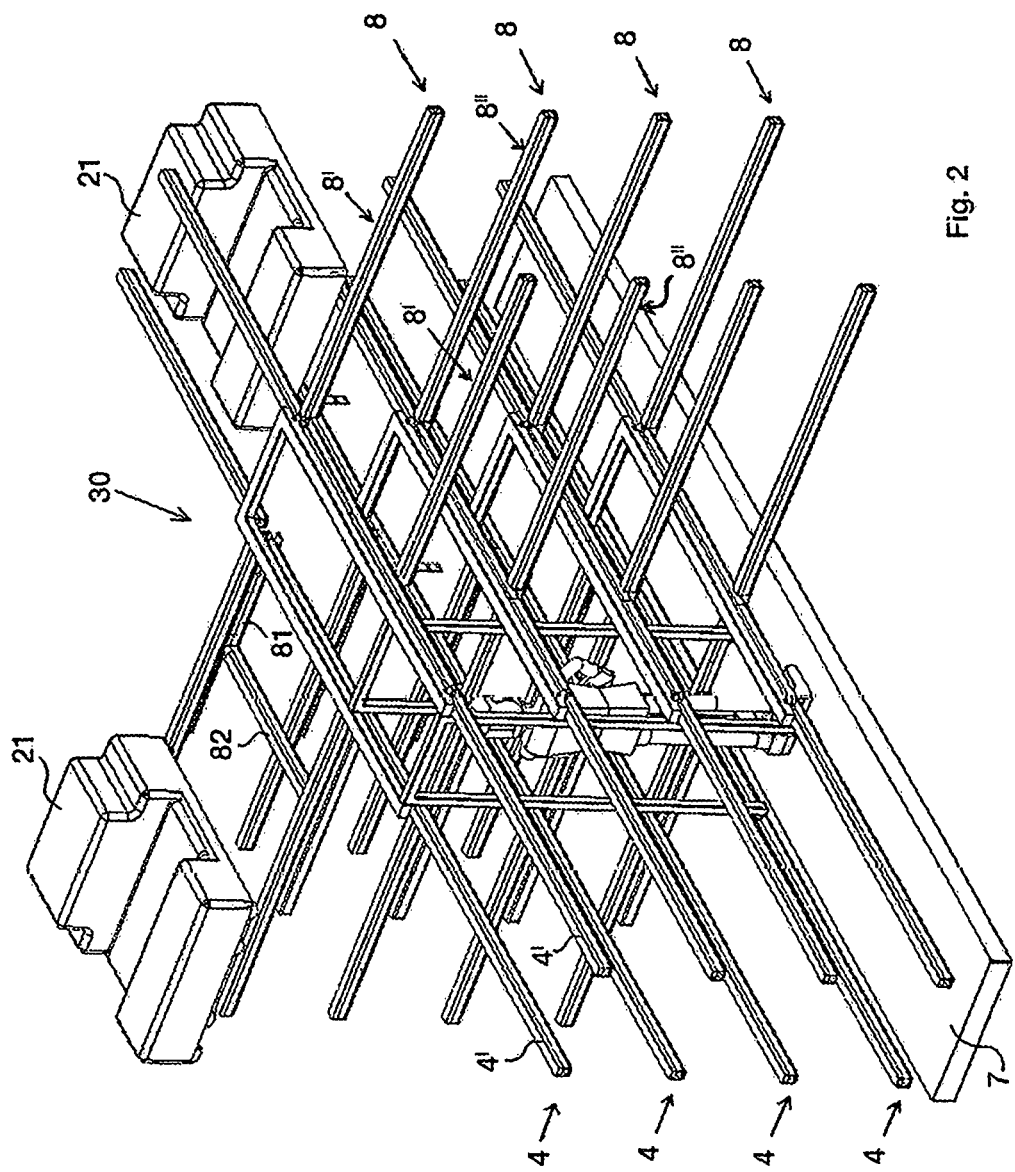
FIG. 2 is a three-dimensional representation of a part of another preferred embodiment of a storage system according to the invention

FIG. 2 shows a part of a storage system according to the invention comparable to the storage system 1 according to the invention as described in the foregoing. Parts of the system that correspond to each other are indicated by corresponding numerals. Four pairs of rails 4 associated with four successive superposed levels, extending in an aisle between two adjacent racks of the storage system according to FIG. 2, of the storage system according to FIG. 2 are shown in the figure. No racks are shown, although the rails of an individual pair of rails are each fixed to one of the two adjacent racks. Provided under the lowermost level that is shown is a platform 7, which extends across the width of the aisle and on which maintenance mechanic can walk, for example. Such a platform 7 may be provided for every four levels, so that respectively four successive levels are accessible to a maintenance mechanic who is present on a platform.

FIG. 2 also shows four pairs of rails 8 of cross connections as described above, which are associated with the aforesaid four successive superposed levels. A shuttle 21 is present on a cross connection, on rails 8, on the uppermost level shown in FIG. 2, whilst a shuttle 21 is present in an aisle, on rails 4, on the uppermost level but one.

Figure 3:
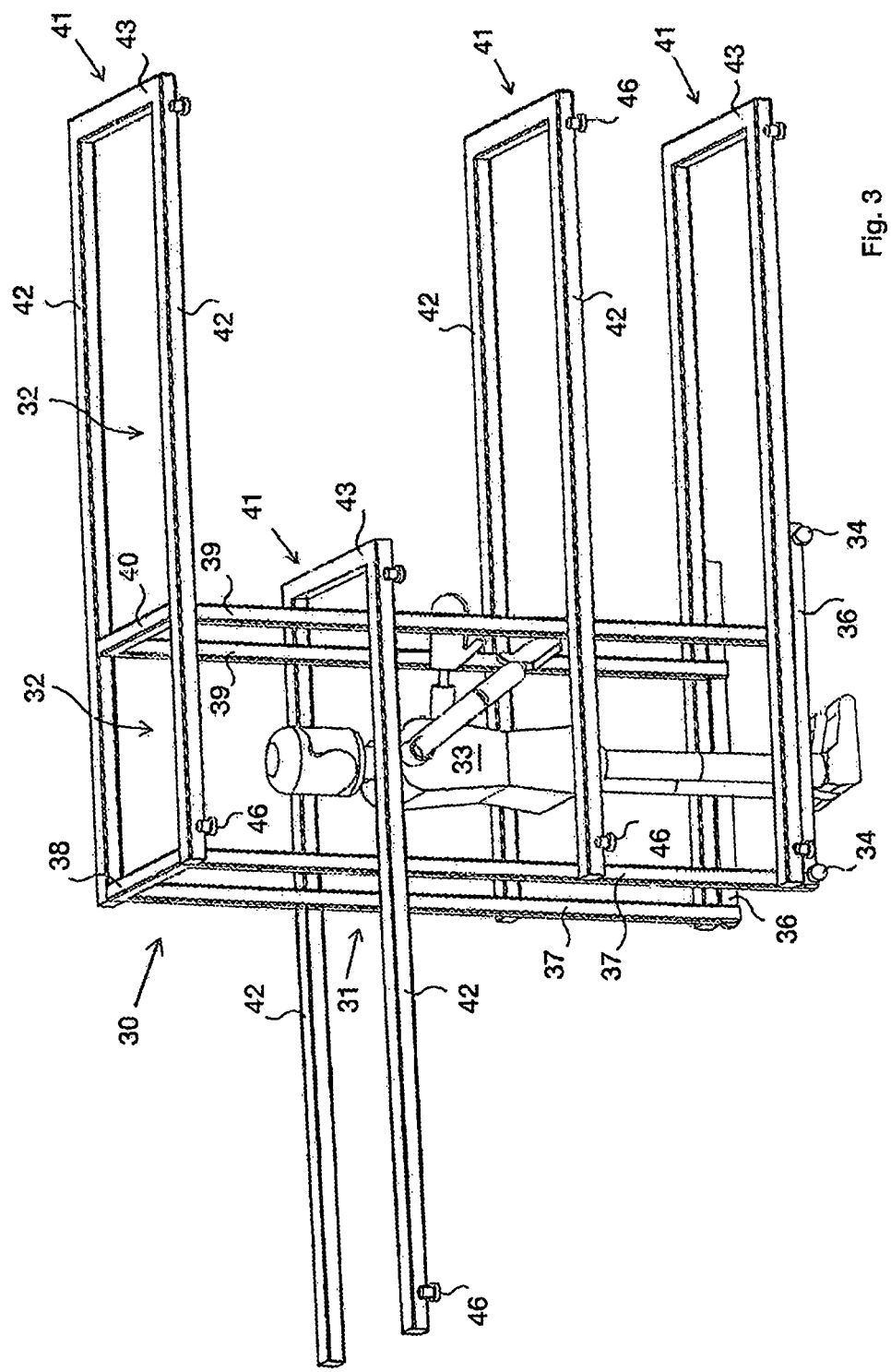
FIG. 3 is a side view of a maintenance cart of a storage system according to FIG. 1 or 2.

FIG. 2 further shows a maintenance cart 30. FIG. 3 shows the maintenance cart as such. The maintenance cart 30 has a frame 31, which defines a working space 33 that is not accessible to shuttles 21. An individual, such as a maintenance mechanic 33, may be present in the working space, protected by the maintenance cart, for carrying out work, such as maintenance work, on a shuttle 21. The maintenance cart 30 has four running wheels at a bottom side of the frame, two on either longitudinal side, which are designed to roll over the running surfaces of the rails 4 on which also the shuttles move. The wheels 34 are mounted on girders 36 forming part of the frame, being freely rotatable about their respective horizontal axes. From the girders 36 two uprights 37, one in each corner, extend upward over three superposed levels at the location of a rear short-end side of the maintenance cart 30. At the upper side of the maintenance cart, the uprights are interconnected by means of a cross beam 38. A comparable construction of two uprights 39 with a cross beam 40 is provided more to the front on the maintenance cart. The uprights 37, 39, the girders 36 and the cross beams 38, 40 form a fixed frame part. The bottom side of the maintenance cart 30 is open, so that the maintenance mechanic can push the maintenance cart 30 ahead through an aisle while walking over the platform 7 from his position in the working space 32. Alternatively, the maintenance cart has a driving system for driving at least one of the wheels 34, for example electrically, which makes use of a battery, an electric motor and at least one of the wheels, which are operatively interconnected. In such a case the bottom side of the maintenance cart can be at least partially closed.

The maintenance cart 30 further has a movable frame part formed by four blocking elements 41 forming part of the frame 31, which are provided at the level of four successive superposed levels during use of the maintenance cart 30 in the storage system 1. Refer to FIG. 2 within this framework. Each of the blocking elements 41 is formed by an at least substantially U-shaped bracket, which lies substantially in the plane of the associated level and which at least partially surrounds the working space 32. Two longitudinal legs of the U-shape are made up of two longitudinal girders 42 which each extend on the outer side of the uprights 37, 39 on each longitudinal side of the maintenance cart 30 and which are connected thereto in such a manner as to be movable in the plane of a level, or in other words, horizontally in use, via a longitudinal guide that is not shown in the figures. The two longitudinal legs formed by the longitudinal girders 42 are connected by a cross leg of the U-shape, which is formed by a cross beam 43. The cross beams 43 form a front short end of the maintenance cart 30. For further guidance of the blocking element 41 and furthermore for the sake of stability of the maintenance cart 30 at such in the storage system, guide wheels 46 being rotatable about a vertical axes are provided on the outer side of the two longitudinal girders 42 of a blocking element, near the ends thereof, which guide wheels roll over at least a vertical running surface of the rails 4 of the level associated with the blocking element 41 in question during movement of the maintenance cart through the aisle, thereby ensuring that the maintenance cart cannot tilt in a direction transversely to the direction of movement.

Thus, an at least substantially rectangular frame, seen in top plan view, is formed in the above-described manner, which comprises two longitudinal sides which extend at least substantially parallel to the racks in use, which two longitudinal sides are connected by a short end rear side and a short end front side, whilst the frame has the form of a cage. The terms "rear side" and "front side" refer to the short end side that corresponds to the direction in which the maintenance mechanic shown in FIGS. 2 and 3 is oriented, i.e. in FIG. 3 the right-hand short end is the front side of the maintenance cart. In use, the front side of the maintenance cart thus faces the shuttle on which maintenance work or the like is to be carried out.

As can be clearly concluded from FIG. 2, the blocking element 41 block the aisle 41 such that as a result of the presence of the cross beam 43 on one short end side or the uprights 37 on the opposite short end side no shuttle 21 can move through the aisle over the rails 4, past the maintenance cart, and that as a result of the presence of the longitudinal girders 42 no shuttle can move over the rails 8 of a cross connection, past the maintenance cart 30. In other words, the working space 32 bounded by the frame 31 of the maintenance cart 30, including the blocking element 41, is not accessible to shuttles from whichever side.

The maintenance cart 30 is configured to fit in the space between the respective pairs of rails 4 on each level in order to thus be able to move through the aisle. Since the maintenance cart extends over four successive levels, seen in vertical direction, the cross connections that cross the aisles may constitute an impediment to movement of the maintenance cart 30 past said cross connections. To cope with this problem, the storage system is configured so that at least the cross connections, at least the part thereof that extends through an aisle, are movable between a closed position, in which said part is located in the aisle and a shuttle can move past via the cross connection, and an open position, in which said part has been moved out of the range of the aisle, so that no shuttle can pass via the cross connection at that location, whereas, by contrast, a maintenance cart can pass the cross connection through the aisle. In the embodiment shown in the figures, two rail parts 81 (one of which is shown in FIG. 2) of the two associated respective rails 8 of a pair of rails on a level can for that purpose be moved out of the way. As shown in FIG. 2, the rails 8' of a pair of rails 8 on the uppermost level shown in the figure are interrupted. The rail parts 81 have for that purpose been moved downward and sideward, so that the aisle on that level is clear for the maintenance cart 30 to pass. As is also shown in FIG. 2, the rail parts 81 are connected to rail parts 82 associated with the respective rails 4' of a pair of rails 4, so that in fact a rectangular construction is obtained, which can be moved aside as a whole. Moving a part 82 of a rail of a pair of rails 4 as well is not necessary within the framework of the present invention.

The above-described blocking elements 41 are movable in the plane of the associated level (in use) relative to the uprights 37, 39 of the frame 31 between a first position, which makes the working space on the side of the shuttles smaller, and a second position, which makes the working space on the side of the shuttle larger. The reason for this is that when a shuttle 21 on a particular level needs to be repaired or the like, the blocking element 41, or at least the cross beam 41 thereof, can be moved from a second, extended position in the direction of the uprights to a first, retracted position, i.e. to the left in the view shown in FIG. 3, so as to thus clear space for a shuttle on that level. In FIG. 3, the blocking element on the uppermost level but one is in the retracted position in comparison with FIG. 2, whilst the other blocking elements of the number of blocking elements are in the extended position. This makes it possible for the shuttle on the associated level to get to a position located at least partially above or below the other blocking elements 41 associated with the other levels over which the maintenance cart 30 extends, seen in vertical direction, for example by moving the maintenance cart further in the direction of the shuttle after a blocking element has been placed in the first, retracted position. This enables the maintenance mechanic to carry out work on the shuttle to be maintained within the safe working space that cannot be reached by shuttles, because the shuttle in question is in fact located within the area that is bounded by the other blocking elements.

With the storage system according to the invention as described above it is thus possible to proceed as follows in the case of, for example, a shuttle that has broken down somewhere in the storage system. First of all, the maintenance mechanic must make his way to the shuttle in question with the maintenance cart through the aisle where said shuttle is located, during which movement the maintenance mechanic is located within the working space. Then he needs to arrange that the blocking element on the level of the shuttle to be repaired is in the first position at the location of the shuttle and that the other blocking elements are in the second position. The working space is thus made larger. In the situation shown in FIG. 2, the maintenance mechanic must thus carry out this step yet for the uppermost level but one, or in other words, for the third blocking element, seen from the bottom up. In the situation shown in FIG. 3, this step has already been carried out. The maintenance mechanic must then move the shuttle to a position above or below the blocking elements in the second position thereof, for example by moving further toward the shuttle with the maintenance cart. FIG. 3 clearly shows that space into which the shuttle to be maintained can be moved has been created on the level of the retracted blocking element, or in other words, the blocking element that is in the first position. The maintenance mechanic can then maintain or repair, as the case may be, the shuttle in question from the bottom side and from the upper side from the working space 32.

If the storage system comprises cross connections, the rails 8 of a cross connection that cross the aisle are moved to the open position as described above at the location of the aisle for carrying out the above-described first step while moving to the shuttle, and after the shuttle has been repaired, when the maintenance mechanic moves back out of the aisle with the maintenance cart and optionally also with the shuttle and after the maintenance cart has passed the cross connection in question, said rails 8 are returned to the closed position again so that a shuttle can cross the aisle again via the cross connection in question.

Figure 4:
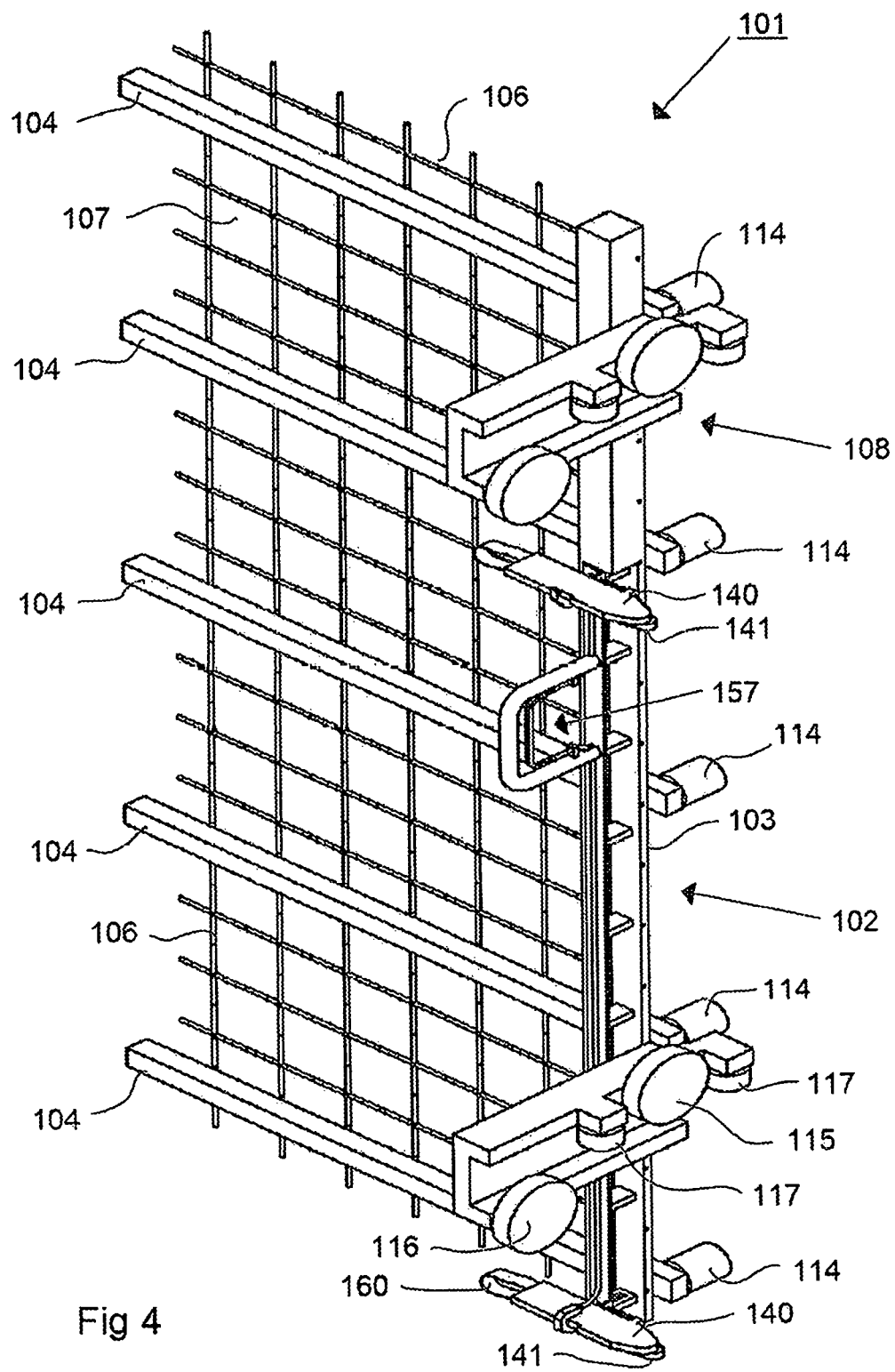
FIG. 4 shows a second embodiment of a maintenance cart that may form part of a storage system according to the invention.

FIG. 4 shows a maintenance cart 101. The maintenance cart 101 is used in a storage system that is comparable to the storage system 1 shown in FIGS. 1 and 2. The storage system that is used comprises rails 110 on each level of the racks of the storage system. Each of the rails 110 comprises two guides 110' that extend within an aisle between two adjacent racks of the storage system. Shuttles 21 (FIG. 7) move over the guides 110'. The guides 110' are disposed mirror-symmetrically opposite each other. Each of the guides 110' is substantially U-shaped (see also FIGS. 6 and 7), with the horizontal part of the U-shape forming a running surface 120 both for the running wheels of the shuttles 21 and for running wheels 115 (yet to be described) associated with the maintenance cart 101. The outer upright legs 121 of the U-shape of the guides 110' are higher than the inner upright legs 122. The upright legs form vertical guide surfaces for guide wheels 117 yet to be described. The distance between facing sides of the upright legs 121 and 122 is slightly larger than the diameter of the guide wheels 117.

The maintenance cart 101 has a frame 102 which comprises a single upright 103 as well as five parallel equidistant girders 104, which are rigidly connected at one end to the upright 103 on the front side of the upright. A latticework 106 having square lattice openings 107 is attached to the front sides of the girders 104. The dimension of each of the lattice openings 107 is 10 cm by 10 cm. A bumper element 114 is provided on each girder 104 at the front side of the maintenance cart 101, near the upright 103.

Figure 5:
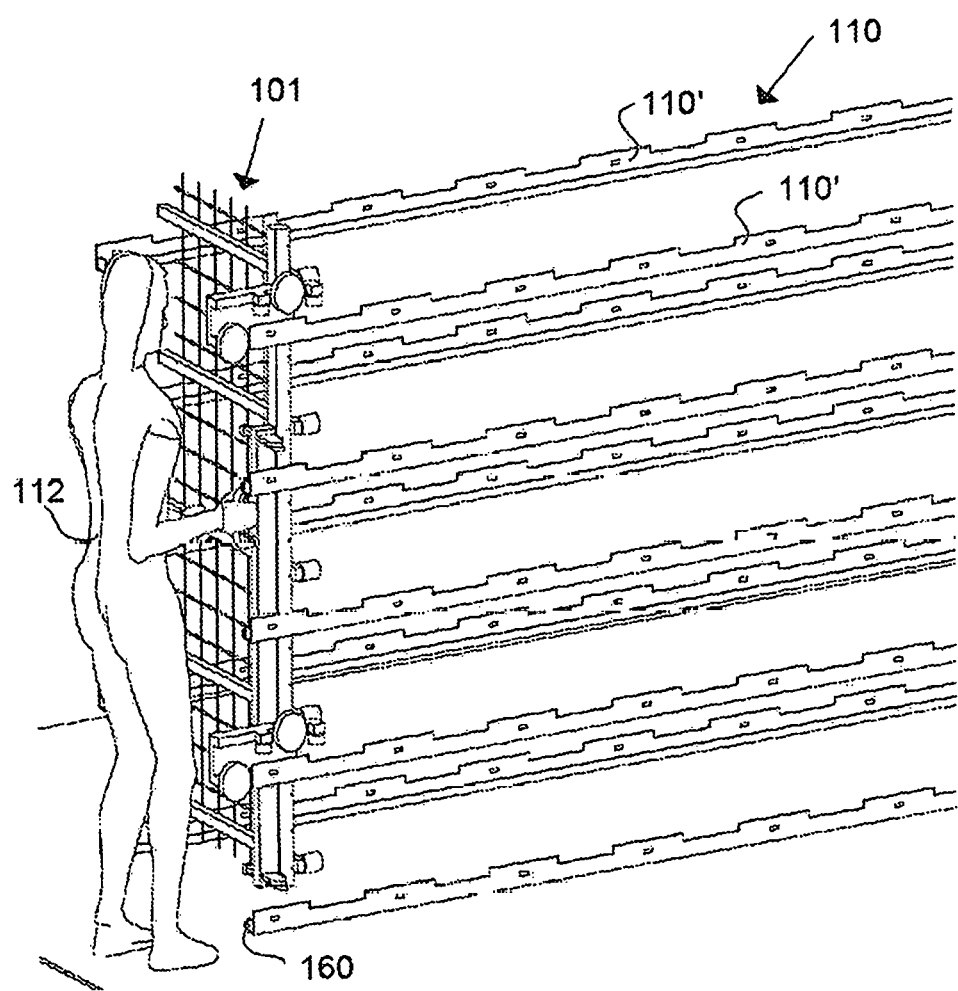
FIG. 5 shows individual placing the maintenance cart according to FIG. 4 in guides associated with an aisle of a storage system.
Figure 6:
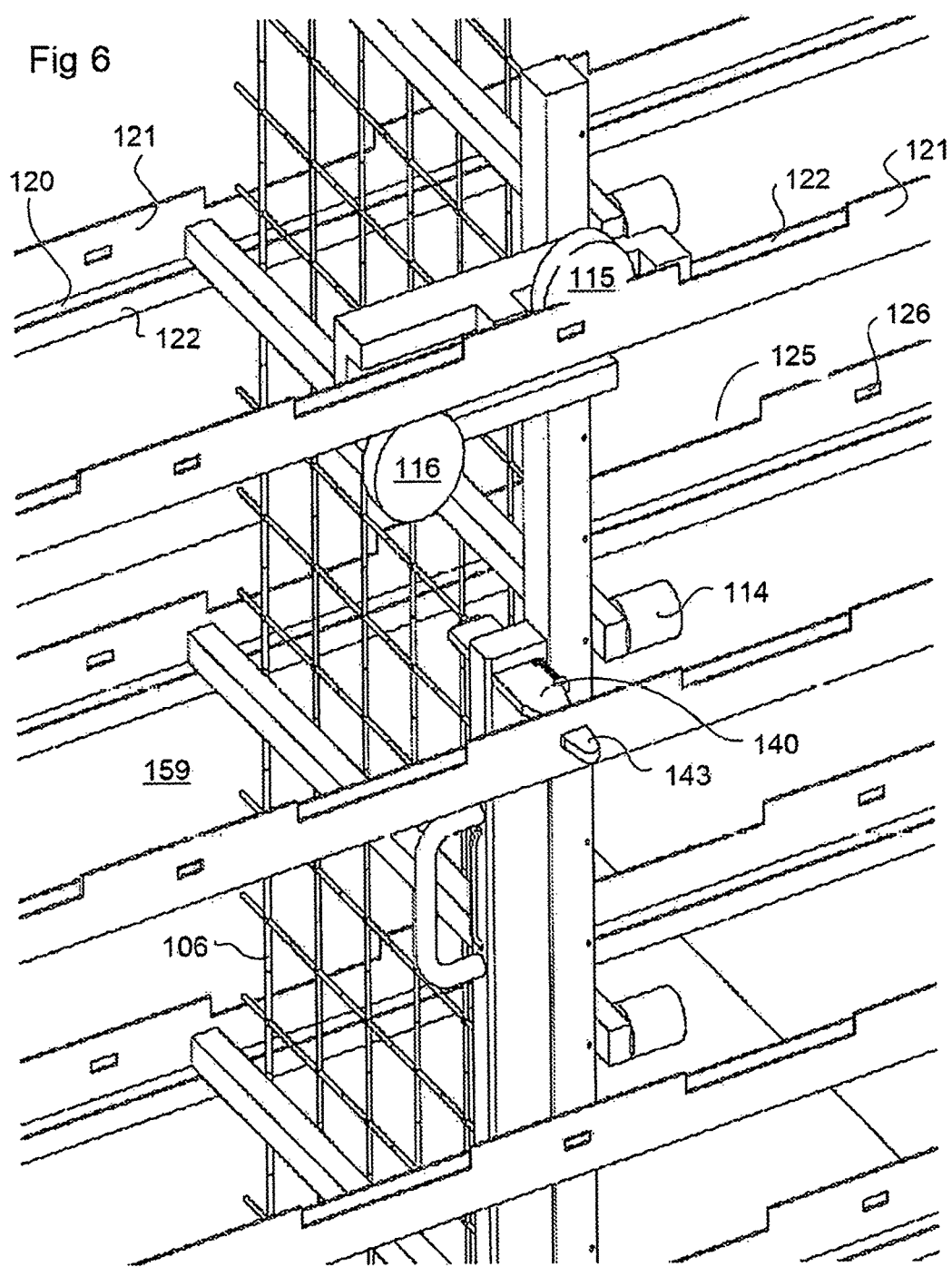
FIG. 6 shows (a part of) the maintenance cart in the aisle according to FIG. 5.
Figure 7:
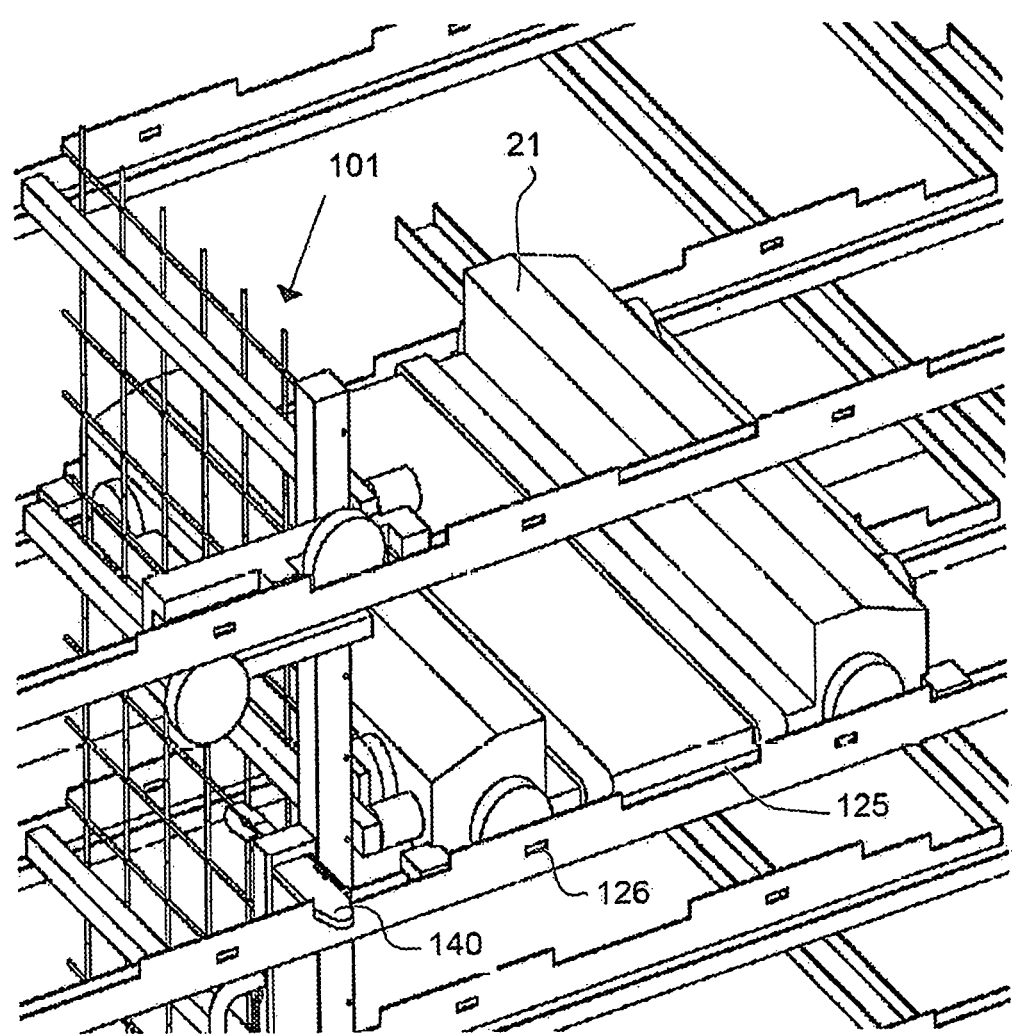
FIG. 7 shows (a part of) the maintenance cart in the aisle, in which aisle a shuttle is present as well.

In use, the frame 102 extends perpendicular to the rails 110, as shown in FIGS. 5, 6 and 7. The maintenance cart 101 is designed for being moved through an aisle 111, over two superposed guides 110' on one side of the aisle 111 in question, by an individual 112. The maintenance cart 101 is for that purpose provided with two running parts 108 provided directly above each other. The distance therebetween equals the distance between three levels. Each running part 108 comprises a base element 109 and four guide means. More specifically, said guide means are embodied by a running wheel 115, a retaining wheel 116 and two guide wheels 117. The running wheel 115 and the retaining wheel 116 are connected to the running part 108, being rotatable about respective horizontal axes of rotation that extend parallel to the girders 104. The two guide wheels 117 are connected to the running part 108, being rotatable about vertical axes of rotation. The guide wheel 117 is positioned higher than the retaining wheel 116, and that to such an extent that a spacing slightly larger than the thickness of the running surface 120 of the guides 110' is present between the bottom side of the guide wheel 117 and the upper side of the retaining wheel 16. Furthermore, the retaining wheel 116 is in its entirety located behind the guide wheel 117. One of the guide wheels 117 is located between the running wheel 115 and the retaining wheel 116, whilst the other guide wheel is located at the front side of the running wheel 115.

Recesses are provided in a regular pattern in the outer guide surfaces 121 of the guides 110', above the level of the upper edge of the associated inner guide surfaces 122. The regularity of said pattern corresponds to the regularity with which the storage positions are provided on either side of the aisle in question. The pitch of such a pattern is typically 40 cm to 60 cm. More specifically, said recesses are wide recesses 125 provided in the upper edge of the outer guide surfaces 121 and relatively small, enclosed recesses 126 in the middle between and just below the level of the recesses 125. The recesses 125 function to provide space for arms of the shuttles 21, which can be extended to within storage positions. The recesses 125 are also used for fixing a maintenance cart 101 at a particular position in an aisle, as will appear hereinafter. The recesses 126 are also provided as markers for sensor means (not shown) on the shuttles to allow the shuttles to determine their position within the storage system, more in particular relative to a storage position 6 thereof.

The maintenance cart 101 is provided with fixing means for said fixation of the maintenance cart 101. The fixing means comprise two pairs of fixation strips 140, 141, which each extend one level below the respective running parts 108 in use. The fixation strips 140 are located on the same level as the recesses 125, whilst the fixation strips 141 are located on the same level as the recesses 126. The fixation strips 140, 141 each have an outwardly oriented, rounded end 142, 143, respectively, and can move forward and backward relative to the strip 144 that is rigidly connected to the upright 13, in a horizontal direction of movement perpendicular to the guides 110', between a retracted, free position and an extended, fixing position. In the free position, the rounded ends 142, 143 of the fixation strips 140, 141 are located on the inner sides of the outer guide surfaces 121. In the extended position, the ends 142, 143 extend within the recesses 122, 121, providing that the fixation strips 140, 141 are positioned directly opposite said recesses 122, 121.

A compression spring 146, 147 is provided for each fixation strip 140, 141, respectively, which compression spring acts between the strip 144 and a projecting part 148, 149 of the respective fixation strips 140, 141. The compression springs 146, 147 urge the fixation strip outward, i.e. toward the fixing position.

Figure 10:
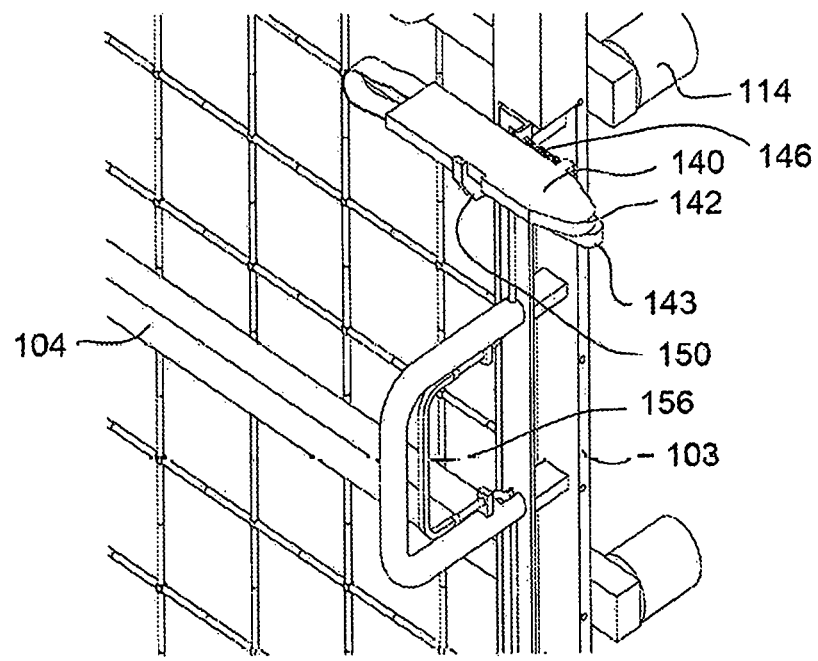
FIG. 10 shows the operating mechanism that forms part of the maintenance cart in the operated condition.

A blocking element 150 is furthermore provided for each pair of fixation strips 140, 141. The blocking element 150 is movable in a horizontal direction parallel to the guides 110' relative to the strip 144 between a blocking position and a non-blocking position. In the blocking position shown in FIGS. 8a, 8b and 10, the blocking element 150 falls into recesses 151, 152 provided in the respective fixation strips 140, 141. In the blocking position, the blocking element 150 thus blocks movement of the fixation strips 140, 141 from the free position to the fixing position. In the non-blocking position, there is no such blocking and the fixation strips 140, 141 can in principle move from the free position to the fixing position under the influence of the action of the compression springs 147, 148, provided that the associated fixation strip is positioned directly opposite a recess 126, 125. In view of the alternate positioning of the recesses 125, 126, this can only be the case for one fixation strip 140, 141 of a pair of fixation strips 140, 141. The skilled person will appreciate that guides must be provided to enable movement of the fixation strips 140, 141 and of the blocking element 150. Said guides are not shown for the sake of clarity.

Under the influence of the compression spring 153 that acts between the blocking element 150 and the strip 144, or at least a part that is rigidly connected thereto, the blocking element 150 tends to move toward the non-blocking position. Because of this, the fixation strips in turn tend to move toward the fixing position. To make it possible to operate the blocking element 150, the blocking element is connected to a pulling cable 155. The pulling cable is also connected to an operating handle 156, which forms part of a handle 157. The handle 157 also comprises a fixed gripping part 158 on the outer side of the operating handle 156. The operating handle 156 is connected to a cable 155 at two ends, so that the operating handle 156 can operate the two blocking elements 150 associated with the two pairs of fixation strips 140, 141. When an individual pulls the operating handle 156 in the direction of the fixed gripping part 156, against the action of the compression spring 153, which is the natural situation when the handle 157 is engaged, the two blocking elements 150 will move to the non-blocking position, providing that the fixation strips 140, 141 are in the free position, so that the associated recesses 151, 152 provide space for the movement in question of the blocking element 150. To move the fixation strips 140, 141 to the free position, against the action of the compression springs 146, 147, the fixation strips 140, 141 are provided with loops 160 near the ends 142, 143, by means of which the fixation strips can be pulled inward, using a hand or both hands or a foot.

When the shuttle 21 is present in an aisle and requires maintenance at that location, a maintenance mechanic 112 will have to make his way to the shuttle 21 through said aisle. This needs to be reported to the control system of the storage system, of course, so that movement of (other) shuttles 21 in the aisle, or at least within the height of the aisle that the maintenance mechanic 112 needs, will not be possible. The risk that this will nevertheless happen cannot be entirely excluded, because the shuttles have their own drive unit and energy supply. The maintenance cart 101 is therefore used as an additional precautionary measure. The maintenance mechanic 112 places the maintenance cart 101 in the aisle by lifting the running wheels 115 from one end of the aisle over the end stops 170 on the respective ends of the guides 110' and lowering them a short distance behind said end stops 170, so that the running wheels 115 will be supported on the running surfaces 120. Subsequently, the maintenance mechanic 112 pushes the maintenance cart 101 through the aisle in the direction of the shuttle 21, keeping the operating handle 156 in the operative position shown in FIGS. 8a and 8b with his right hand. During said movement, the retaining wheel 116 moves just below the running surface 120, without making contact, thus ensuring that the maintenance cart can be lifted upward. Furthermore, the guide wheels run against one of the guide surfaces 121, 122, so that lateral movement of the guide surfaces 121, 122 will not be possible, either, or at least only to a very limited extent.

Figure 11:
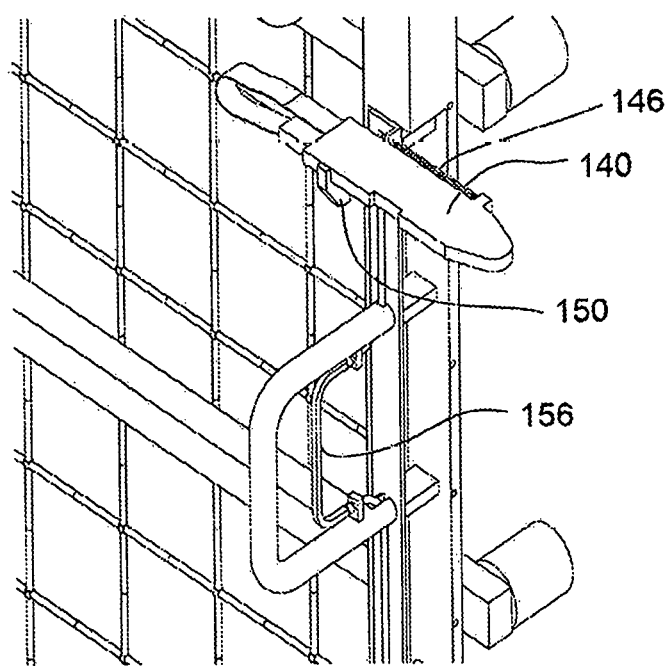
FIG. 11 shows the operating mechanism that forms part of the maintenance cart in the non-operated position.
Figure 12:
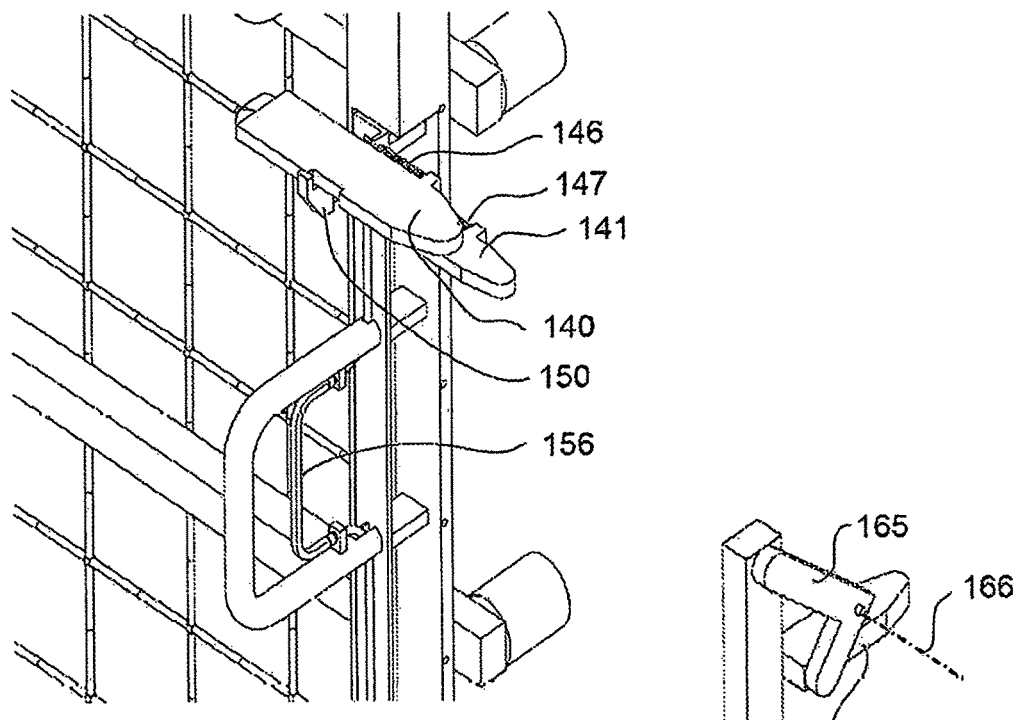
FIG. 12 shows the operating mechanism, including a part of the maintenance cart, in another non-operated condition.

Once the maintenance mechanic 112 has arrived at the shuttle 21 with the maintenance cart 101, in which situation the maintenance mechanic 112 is located on the side of the flat frame 102 provided with the latticework 106, remote from the shuttle 21, the maintenance mechanic will release the operating handle 156, as a result of which the fixation strips 140, 141 will tend to move to the fixing position. Insofar as one of the fixation strips 140, 141 is positioned opposite a recess 125, 126, the fixation strip 140, 141 in question will move into the recess 125, 126 with the end 141, 142, so that the maintenance cart 101 is fixed in position, or at least to a significant extent, relative to the guides 110'. FIGS. 9a, 9b and 12 show the situation in which this is the case for the fixation strip 141. The ends 142 of the fixation strips 140 will in that case press against the inner sides of the outer guide surfaces 121. FIG. 11 shows the situation in which the end 142 of the fixation strip 140 extends within the recess 125, with the end 143 of the fixation strip 141 pressing against the inner side of the outer guide surface 121. It will be understood that with this fixation of the maintenance cart 101, some degree of movement of the maintenance cart 101 is still possible, viz. insofar as the ends 142 can move within the length of the recesses 125. Said length is so short, however, that this is not objectionable.

In the fixed condition of the maintenance cart 101, the maintenance mechanic 112 can carry out maintenance on the shuttle 21 from the working space 159, which is in part defined by the maintenance cart 101 and which is located directly at the rear side of the frame 102, in which situation the maintenance mechanic can reach the shuttle 21 by putting his/her arms through the openings 17.

In the unexpected event of the maintenance cart 101 striking against the bumper elements 114 while moving toward a shuttle 21, a natural reaction of the maintenance mechanic will be to release the operating handle 156, as a result of which the fixation strips 140 or 141 will directly move into the recesses 125, 126 provided that the associated fixation strip 140, 141 is positioned directly opposite a recess 126, 125. Insofar as none of the fixation strips 140, 141 would be positioned directly opposite recesses 125, 126 at the moment when the operating handle 156 is released by the maintenance mechanic 112, this will happen yet after the maintenance cart has been moved over the rails 110 over a limited distance of at most 25 cm as a result of colliding with the shuttle 21. The maintenance cart is thus fixed to the guides 110', so that there will be no risk of the maintenance mechanic being hit by the shuttle 21 or by the maintenance cart 11.

Figure 13:
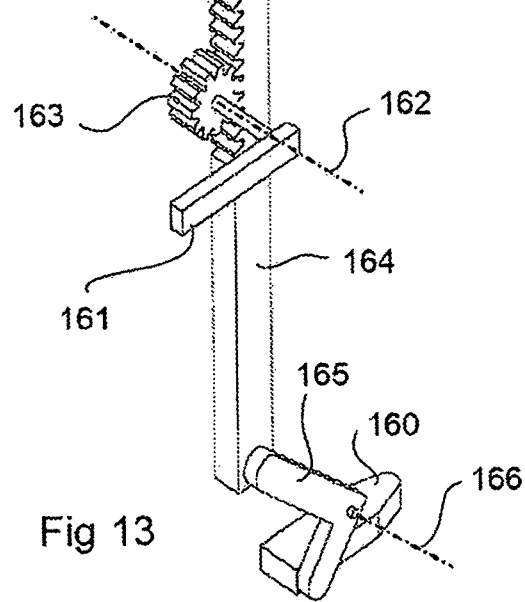
FIG. 13 shows an alternative operating mechanism for a maintenance cart.

FIG. 13 schematically shows another alternative operating mechanism, in which use is made of two fixation strips 167, comparable to the fixation strips 140 or 141. The operating mechanism comprises an operating lever 161, which is pivotally connected to the upright 103 about a pivot axis 162. The operating lever 161 is rigidly connected to a gear 163 whose teeth mesh with the teeth of a rack 164. Pivoting the operating lever downward will cause the rack 164 to move upward. The rack 164 is connected to bell-crank levers 165 at two opposite ends, which levers are each pivotable about pivot axes 166 relative to the upright 103. When an individual releases the operating lever 164, the rack 164 will move downward, or at least tend to move downward, under the influence of the force of gravity, as a result of which the fixation strips 167 will assume or at least tend to assume the fixing position.

The invention claimed is:

1. A storage system comprising:
    at least two racks that extend parallel and adjacent to each other, and shuttles, the at least two racks having storage positions for products disposed beside and above each other and with an aisle extending between sets of two racks, through which shuttles move forward and backward over respective guides parallel to the racks on a multitude of superposed levels for placing products in the storage positions and/or removing products from the storage positions,
    a maintenance cart configured to move through the aisle, wherein:
    the maintenance cart defines a working space for an individual, bounded at least partially by a frame of the maintenance cart, for carrying out maintenance from the working space on a shuttle in the aisle when the maintenance cart is present in the aisle and the frame extends over at least two levels of the multitude of levels and forms a screen for the working space against shuttles in the aisle,
    the maintenance cart is configured to move over a guide for the shuttles through the aisle,
    the maintenance cart is provided with guide members that cooperate with the guide for the shuttles, and
    the maintenance cart guide members being provided at levels of two superposed guides.

2. The storage system according to claim 1, wherein the frame extends over at least three levels of the multitude of levels.

3. The storage system according to claim 1, wherein the maintenance cart is provided with at least two guide members, per guide level, wherein one of the at least two guide members cooperates with the guide via an upper side thereof while another of the at least two guide members cooperates with the guide via a bottom side thereof.

4. The storage system according to claim 3, wherein the two guide members are provided at different longitudinal positions of the guide.

5. The storage system according to claim 1, wherein the frame has the form of a cage.

6. The storage system according to claim 1, wherein the frame of the maintenance cart is at least substantially flat.

7. The storage system according to claim 1, wherein the maintenance cart is only provided with guide members on one longitudinal side of the aisle.

8. The storage system according to claim 1, wherein each of the shuttles are provided with a driving system for movement of the shuttle in the storage system, an energy storage medium for energizing the driving system and for energizing transfer members present on the shuttle for placing products in a storage position and/or removing products therefrom, and signal transfer members for wirelessly transmitting signals to a central control system and receiving signals therefrom.

9. The storage system according to claim 1, wherein the maintenance cart comprises openings for carrying out work from one side of the frame of the maintenance cart, via the openings, on a shuttle which is present on an opposite side of the frame of the maintenance cart.

10. The storage system according to claim 1, wherein the maintenance cart comprises fixing members for fixing the maintenance cart relative to the guide.

11. The storage system according to claim 10, wherein the guide is provided with a number of recesses along a length thereof and that the fixing members comprises at least one fixing element, which, when a fixing element is located at a same longitudinal position as a recess, is movable between a free position and a fixing position, in which the fixing position, unlike in the free position, the fixing element extends within the recess.

12. The storage system according to claim 10, wherein the maintenance cart comprises operating members for operating the fixing members.

13. The storage system according to claim 12, wherein the maintenance cart comprises at least one handle, wherein an operating element of the operating members forms part of the handle, such that when the handle is engaged by a user, the operating members keeps the fixing members in the free position and that, when the handle is released by a user, the operating members urges the fixing members toward the fixing position.

14. A method for carrying out maintenance on a shuttle in a storage system according to claim 1, comprising the steps of:
  a) an individual moving with the maintenance cart toward a shuttle present in the aisle, during which movement the individual is present in the working space, and
  b) carrying out maintenance on the shuttle from the working space.

15. The method according to claim 14, wherein the maintenance is carried out via openings in the maintenance cart during step b).

16. The method according to claim 14, wherein the maintenance cart is fixed to guide by fixing members between step a) and step b).

\* \* \* \* \*